May 26, 1936.  R. M. NARDONE  2,042,356

TRANSMISSION

Filed June 17, 1932  7 Sheets-Sheet 1

Fig. 1

INVENTOR.
Romeo M. Nardone
BY Warren T. Hunt
ATTORNEY.

May 26, 1936.  R. M. NARDONE  2,042,356

TRANSMISSION

Filed June 17, 1932  7 Sheets-Sheet 2

INVENTOR.
Rome M. Nardone
BY Warren T. Hunt
ATTORNEY.

May 26, 1936.   R. M. NARDONE   2,042,356
TRANSMISSION
Filed June 17, 1932    7 Sheets-Sheet 3

INVENTOR.
Romeo M. Nardone
BY
Warren T. Hunt
ATTORNEY.

May 26, 1936.  R. M. NARDONE  2,042,356

TRANSMISSION

Filed June 17, 1932   7 Sheets-Sheet 4

INVENTOR.
Romeo M. Nardone
BY
Warren P. Hunt
ATTORNEY.

Patented May 26, 1936

2,042,356

UNITED STATES PATENT OFFICE 2,042,356

TRANSMISSION

Romeo M. Nardone, East Orange, N. J., assignor, by mesne assignments, to Eclipse Aviation Corporation, East Orange, N. J., a corporation of New Jersey Application June 17, 1932, Serial No. 617,887

38 Claims. (Cl. 74—336)

This invention relates to transmission mechanisms, and more particularly to automatic variable speed transmission mechanisms.

The invention herein is illustrated as embodied in an automobile transmission such as is ordinarily used for transmitting the power from the engine to the rear wheels through variable gear ratios adapted to multiply the engine torque delivered.

Various types of automatic transmissions have been designed heretofore, and it is usual to provide a transmission in which the high speed drive is obtained by directly connecting the driving and driven shafts by a clutch which is engaged and disengaged in accordance with torque reaction. The lower speed gear usually comprises a gear train incuding an overrunning clutch which connects the driving and driven shafts around the clutch whereby, when the clutch is disengaged, the overrunning clutch enables the lower speed gears to pick up the drive. Transmissions of this nature are satisfactory to a certain extent, but if a second gear drive is incorporated, difficulties are encountered because of the inclusion of an overrunning clutch in each of the gear trains. It frequently happens that one or the other of the overrunning clutches is not properly disengaged, and one of the objects of the present invention is to provide a transmission with at least three speeds in which means are provided for positively disengaging the overrunning clutch that is incorporated in the intermediate gear train.

Another object of the invention is to provide a variable speed transmission mechanism in which at least three different gear drives may be selectively engaged in accordance with the load and speed of the driven shaft.

Another object of the invention is to provide an automatic transmission mechanism having a high speed gear ratio and a plurality of lower speed ratios including overrunning clutch devices in which at least one of the overrunning devices is positively moved to its overrunning position by a device that is responsive to the load imposed on the low speed drive.

Another object of the invention is to provide an automatic transmission mechanism with a plurality of different speed ratios or gear changes in which at least one of the gear changes is effective only upon a speed synchronization of the driving and driven members.

Another object of the invention is to provide a variable speed transmission mechanism having a friction clutch for the high gear in which the clutch action is controlled by the load on either of two gear trains adapted to connect the driving and driven shaft at reduced driving ratios.

Another object of the invention is to provide a multiple speed transmission mechanism for an engine driven vehicle in which the tendency to gear change is modified by the position of an engine control device which, in the illustrated embodiment, constitutes the throttle control of the engine.

Another object of the invention is to provide a variable speed transmission with a device for automatically changing the gear ratios in the forward speeds and a manually controlled vacuum actuated mechanism for selectively engaging a reverse drive, a positive forward drive, or an automatic multiple speed forward drive.

Another object of the invention is to provide a variable speed transmission mechanism with a centralized fluid control for forward automatic drive, positive forward drive, and reverse drive in which a single control member will cause any of the drives to be engaged or will move any of them to a neutral position.

Another object of the invention is to provide an automatic variable speed transmission with a positive non-automatic drive that may be easily engaged regardless of the variation in speed between the driving and driven shafts.

Other objects and features of the invention will be apparent from the following description, in connection with which certain illustrative embodiments have been shown in the accompanying drawings, in which:

Fig. 7 is a sectional view taken on line 7—7 of

Fig. 1 illustrating the low speed gear and overrunning clutch assembly;

Fig. 8 is a view of the second speed gear hub illustrating the openings through which the pins actuated by the low speed gear may project in order to actuate the shifting nut;

Fig. 9 is a sectional view of the hub shown in Fig. 8;

Fig. 11 is a view similar to Fig. 10 illustrating the position of the parts when the transmission is operating in first or low speed gear;

Fig. 13 is an enlarged view of a portion of the shifting nut and cage for actuating the intermediate gear overrunning clutch illustrating the members locked in position for preventing axial movement of the nut, which position corresponds to that obtained just prior to a gear change from the low to the intermediate gear position;

Figure 1:
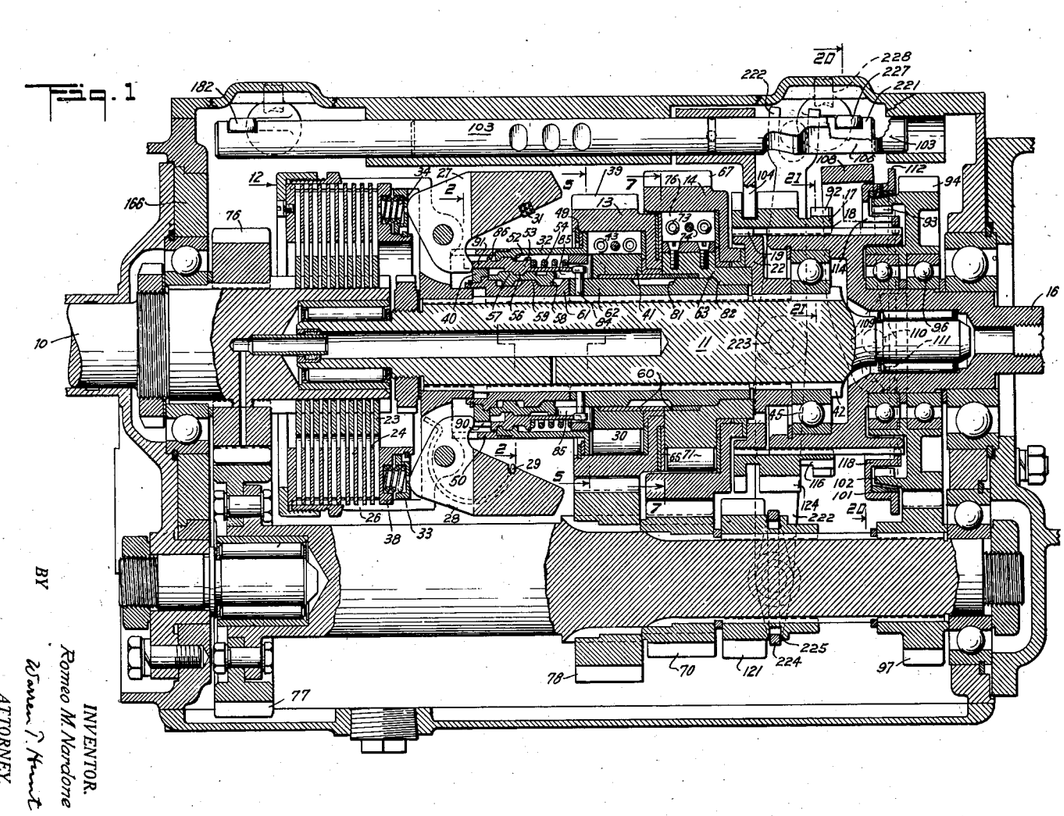
Fig. 1 is a longitudinal sectional elevation of the improved transmission illustrating the parts in the direct drive or high gear position.
Figure 2:
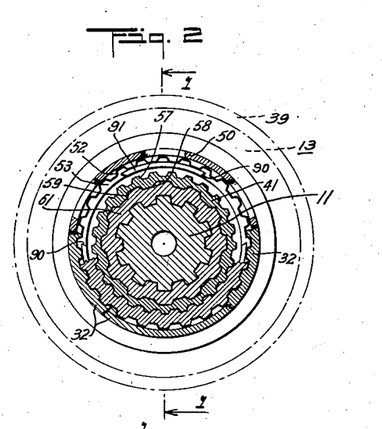
Fig. 2 is a sectional view taken on line 2—2 of Fig. 1 illustrating the arrangement of the concentric sleeves which control the action of the high speed clutch and the disengagement of the intermediate gear overrunning clutch.

Referring to the drawings, and particularly to Fig. 1, motion of the engine or driving shaft 10 is transmitted to the driven shaft 11 by a plurality of variable speed drives, including the high speed clutch 12, the second or intermediate gear device 13, and the first or low speed gear device 14, the driven shaft 11 being normally connected with propeller shaft 16 by a slidable coupling member 17 having a splined connection at 18 with the propeller shaft and having teeth 19 meshing with similar teeth formed on driving member 22 secured to the driven shaft 11.

Figure 10:
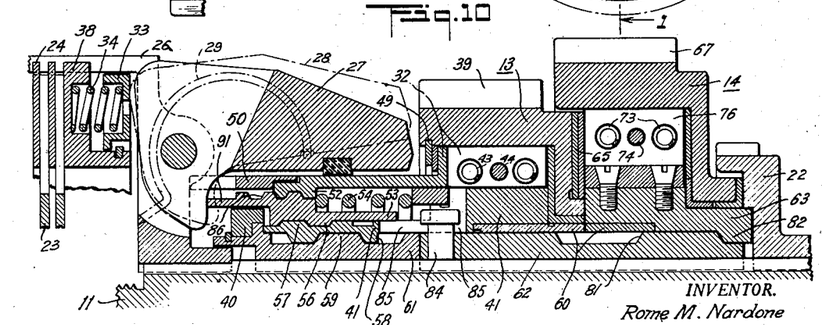
Fig. 10 is an enlarged view of a portion of the transmission illustrated in Fig. 1 but showing the position of the parts when the transmission is at rest.

High speed gear clutch 12 comprises a series of driving and driven plates 23 and 24 respectively, plates 24 being slidably keyed to the clutch housing 26 and plates 23 being slidably keyed to driving shaft 10. The engagement of the plates 23 and 24 is accomplished by centrifugal weights 27 and 28, it being understood that weights 27 and 28 are arranged at equal angular distances about the clutch housing, the weights 27 alternating with weights 28 and springs 29 being provided on weights 28 for urging them outwardly to engage the plates 23 and 24 with a slight frictional contact. The remaining weights 27 are preferably not provided with springs and while the transmission is at rest will occupy an inner position, as shown in Fig. 10, whereat the cushion member 31 is in contact with cage 32. Weights 27 and 28 preferably act through a resilient pressure plate 33 normally forced toward the right, as viewed in Fig. 1, by springs 34 which may be compressed until pressure plate 33 engages plate 38, whereafter further outward movement of weights 27 and 28 is arrested by their contact with washer 40 which is secured to sleeve 61 having a splined connection with shaft 11. The movement of sleeve 61 toward the right as viewed in Fig. 1 is limited by contact of member 40 with the threaded end 57 of hub 41 which is restrained from movement by thrust liners 60 surrounding sleeve 62, and located in annular recesses formed in hubs 41 and 63, the latter hub being in abutting relation with member 22 which is held in position on shaft 11 by shoulder 42 and bearing 45.

Figure 5:
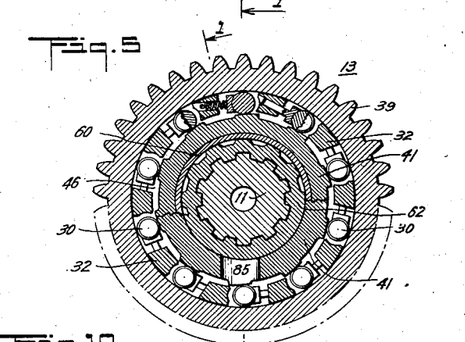
Fig. 5 is a sectional view taken on the line 5—5 of Fig. 1 illustrating the intermediate or second speed gear and its overrunning clutch.
Figure 6:
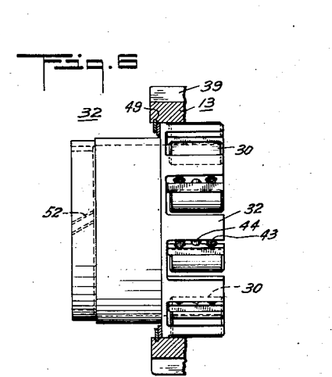
Fig. 6 is a view partly in section of the intermediate speed overrunning clutch illustrating the relation of the cage used to positively disengage the rollers.

The second speed device 13 includes a gear 39 and a hub 41 between which is arranged a series of rollers 30 adapted to be wedged between gear 39 and hub 41 when gear 39 is acting as a driving member, but to permit hub 41 to over-run the gear if the speed of the hub is greater than that of the gear. Rollers 30 are normally urged to their driving position by springs 43 arranged on the opposite sides of guide pin 44, both springs and pin being mounted in cage 32 which is adapted to positively move rollers 30 in a counter clockwise direction, as viewed in Fig. 5, to position the rollers in grooves 46 out of contact with the gear 39 and inoperative to drivably connect the gear with the hub. Cage 32 is held against lateral movement by lock ring 49 and a slotted cylindrical member 50 abutting the housing 26; the cage is provided with internal threads 52 that engage similar threads on a shifting nut 53 normally urged toward the left by spring 54. Nut 53 is also provided with internal threads 56 which coact with external threads 57 formed on a projection of hub 41 and which in turn is also provided with internal threads 58 which coact with external threads 59 formed on sleeve 61 that has a splined connection with the driven shaft 11. Sleeve 61 abuts a similar sleeve 62 having a threaded connection with the hub 63 of the first or low speed device 14.

Figures 7, 8, 9, 11, 13:
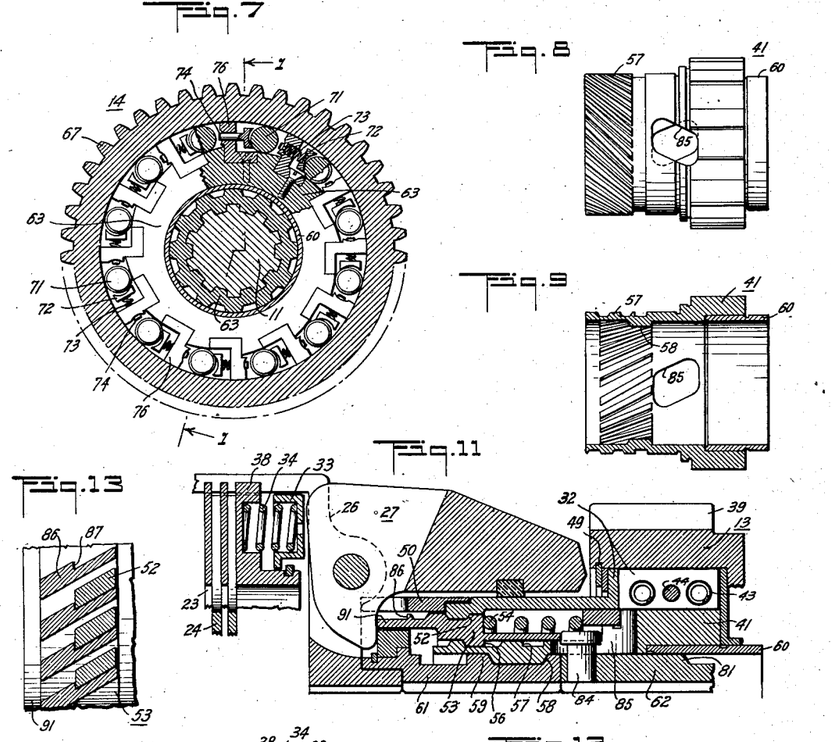

Gear 67 of the first speed device, which is meshed with gear 70, is connected to hub 63 by an overrunning clutch, as illustrated in Fig. 7, which clutch comprises rollers 71 held in assembled relation by spacers 65 normally urged in a clockwise direction, as viewed in Fig. 7, by shoes 72 and springs 73 arranged on opposite sides of a guide pin 74 that is slidable in a support member 76 secured to hub 63. The overrunning clutch in the first speed gear is similar in action to other well known devices of this nature and enables the first speed gear 67 to take the load under certain conditions and to permit hub 63 to overrun the gear when the speed of the driven shaft is greater than that of the gear.

The action of the aforedescribed mechanism is as follows:

Assuming that engine shaft 10 is turning, and weights 27 and 28 have been moved outwardly a sufficient distance to engage clutch plates 23 and 24, motion will be transmitted by the clutch, direct to shaft 11 and to propeller shaft 16 by means of coupler 17 which is in the forward automatic speed position, as illustrated in Fig. 1.

Figure 12:
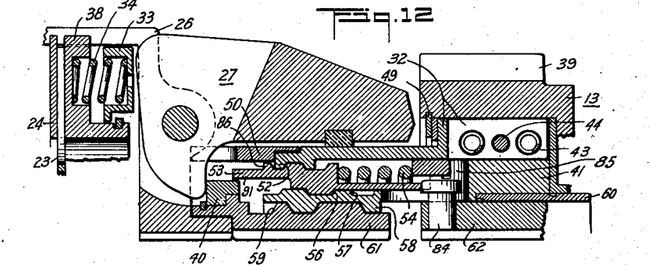
Fig. 12 is a view similar to Figs. 10 and 11 illustrating the position of the parts when the transmission is operating in second or intermediate gear.

If the load on propeller shaft 16 and driven shaft 11 should increase beyond a predetermined amount, the high speed clutch will slip slightly and by reason of threads 58 and 59 sleeve 61 will be forced toward the left, as viewed in Fig. 1, to the position shown in Fig. 12, whereby weights 27 and 28 will be forced to their inner position to disengage the clutch and allow the second speed gear 13 to assume the drive, which is then transmitted from shaft 10 through gears 76, 77, and 78 to the gear 39 which is secured to driven shaft 11 through the coacting threaded portions 58 and 59 to sleeve 61 which is splined to the driven shaft 11. Under these conditions, second speed device 13 is free to drive the propeller shaft 16 at a greater speed than the first or low speed device 14 because of the overrunning clutch incorporated in the latter device. Nut 53 was forced to the right by the weights during the high speed drive and retains this position during the second gear operation because the roller clutch is in a driving position and spring 54 is not of sufficient strength to force nut 53 toward the left and rotate the cage 32 to disengage the rollers when the second speed gear clutch is under load.

If the load on propeller shaft 16 and driven shaft 11 should be still further increased, and it is desired to engage first speed, the load is taken off the second speed gears by momentarily closing the throttle. The overrunning clutch rollers are then released by the action of spring 54 which overcomes the centrifugal force of the weights 27 and rotates the cage 32. Rotation of the cage is produced by coaction of the threaded portion 52 with the external threads of nut 53 and as the cage is restrained from endwise movement by rings 49, it will be rotated by the axial movement of nut 53 toward the left by spring 54. Upon reopening the throttle, member 62 will be moved toward the left by the coaction of threads 81 and 82 to the position illustrated in Fig. 11. The overrunning clutch of second speed device 13 will be positively moved to an inoperative position by the action of pins 84 that are secured to member 62 and project through slots 85 in second gear hub 41, whereby pins 84 may contact with nut 53 and urge it toward the left. Nut 53 is provided with external threads 52 coacting with similar threads formed in cage 32, and it will therefore be seen that axial movement of nut 53 will rotate cage 32 in a clockwise direction, as viewed in Fig. 5, and positively move rollers 30 toward the slots 46 wherein they will be inoperative. The positive disengagement of the intermediate speed overrunning clutch by the action of the first speed device is considered to be very important, as with transmissions heretofore devised the two overrunning clutches incorporated in the gear trains may be engaged at the same time and cause serious damage to the transmission.

If the load on the driven shaft should decrease, the action is in the reverse direction and the second speed device 13 will pick up the load at some predetermined point, and if the load is still further decreased, the centrifugal action of weights 27 and 28 will overcome the axial force of member 61 and enable the high speed clutch to again directly engage the shafts in a direct connection.

The operation in changing from low speed to intermediate is as follows: Referring to Fig. 11 in which the parts are shown in the low speed position, a decrease in load will decrease the thrust of nuts 61 and 62 and they will be moved toward the right by weights 28 which are free to move in slots 90 formed in nut 53. Weights 27 attempt to move nut 53 toward the right from the position shown in Fig. 11, but movement is temporarily prevented, until the driven shaft overruns the driving gear, by a stop device hereinafter more fully described. As soon as the driving gear overruns the driven shaft, weights 27 move nut 53 to the position shown in Fig. 12, whereupon cage 32 is rotated toward the right as viewed in Fig. 5 to engage the second speed rollers 30. The second speed gear can then pick up the load and by reason of its threaded connection with nut 61 forces it to the left to depress the weights 27 and 28 to the position shown in Fig. 12. The transmission is then in second or intermediate gear with the low speed gear overrunning and remains so until the load is further decreased. In the second gear position, nut 53 is urged toward the left by spring 54, but it is unable to move the rollers 30 as they are under load and cannot be dislodged by the spring until the load on the driven shaft is removed. When the transmission is at rest, as shown in Fig. 10, the load on the second speed overrunning clutch has been removed and nut 53 is moved toward the left by spring 54 to the position shown, and the second speed gear is positively disengaged each time the transmission is stopped and it will be observed that if the driving shaft be rotated at slow speed in starting, the clutch 12 will be held in engagement by only the slight pressure of spring pressed weights 28, and therefore for all loads greater than a predetermined minimum the vehicle on which the transmission is used will start in low gear. Change from second to high gear occurs when the load on the driven shaft is reduced to the point where the centrifugal force of weights 27 and 28 is sufficient to overcome the thrust of nut 61, at which time they will move outwardly to the position shown in Fig. 1 and engage the disk clutch 12. In the high speed gear both low and intermediate gears will overrun by reason of the clutches shown in Figs. 5 and 7.

Figure 3:
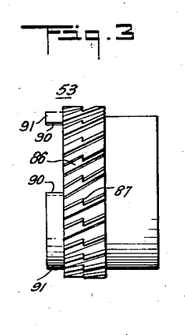
Fig. 3 is an elevational view of the shifting nut which is used to disengage the intermediate speed overrunning clutch.
Figure 4:
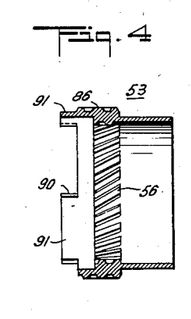
Fig. 4 is a sectional view of the nut illustrated in Fig. 3.
Figure 14:
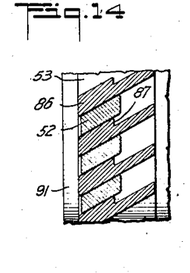
Fig. 14 is a view similar to Fig. 13 illustrating the position of the nut and cage after the change to intermediate gear has been accomplished.

In the changing of the gear speeds from low to intermediate gear, it sometimes happens that the intermediate gear engages too abruptly and as at that time the driving shaft is turning at a high rate of speed, the engagement of the drive produces an objectionable jerk in the motion of the vehicle. In the present invention means have been devised for preventing the engagement of the second speed gear until the speed of the driving shaft has reached substantially that speed which would be imparted by the second speed device. In order to prevent the engagement of the second speed device, the nuts 53 is provided with helical teeth 86 which are reduced in thickness for a portion of their length, as shown in Fig. 3, the junction between the reduced portion of the teeth and the normal tooth forming a shoulder 87 which engages the mating teeth 52 of the cage 32 and prevents nut 53 from moving toward the right to rotate cage 32 to the operative position. The relative position of the cage and nut at the time the low speed gear goes out of action is illustrated in Fig. 13, and this position is maintained until the driving shaft is slowed down by closing the engine throttle, whereupon the nut and cage will rotate relative to each other, the shoulder 87 will clear the tooth 52, and the nut will move toward the right to the position illustrated in Fig. 14, the movement of the nut 53 being accomplished by the contact of the weights 27 with the sleeve extension 91. It will be noted that the movement of weights 28 is ineffective to move member 53, due to the slots 90 formed in extension 91, through which the noses of weights 28 are free to operate at all times.

In the use of the above described transmission, and upon descending a hill, power may be transmitted direct from the propeller shaft 16 to the drive shaft 10 by means of the direct drive clutch. In the ordinary non-automatic type of transmission, the engine may be used as a brake in descending steep grades, but in the present transmission the overrunning clutches will prevent the use of the engine as a brake while in either of the lower speed gears, and means, therefore, have been devised for connecting propeller shaft 16 to the driving shaft 10 by a positive gear driving means whereby the engine may be used as a brake in a lower speed drive. If it should be desired to engage the positive low speed drive, shifting member 17 is moved toward the right, as viewed in Fig. 1, to the position wherein teeth 92 are in engagement with teeth 93 formed on the gear 94 that is rotatably mounted on propeller shaft 16 by bearings 96, in which position the propeller shaft is directly connected to the driving shaft 10 by gears 94, 97, 77, and 76. It will be understood that movement of coupling member 17 toward the right will move teeth 19 out of mesh with the member 22 and disconnect propeller shaft 16 from the driven shaft 11.

As gear 94 is rotatably mounted upon propeller shaft 16 and adapted to be driven relative thereto at a different speed, it will be seen that under certain conditions it will be difficult to mesh teeth 92 with teeth 93. As it is essential that the positive gear be readily engaged at any speed, a synchronizing device has been provided which includes a wedge member 101 having a friction surface 102 adapted to coact with a similar surface on gear 94; the member 101 being splined to the propeller shaft 16. Movement of the member 17 is accomplished by axial movement of shifter rod 103 to which is attached yoke 104. The initial movement of shifter rod 103 toward the right causes the cam surface 106 of the rod to coact with roller 107 and rock the yoke member 108, pivoted to the transmission case at 111, toward the member 101 and urge it into frictional contact with the gear 94, shoes 109 being pivotally mounted on yoke 108 by pins 110 and having recesses therein engagement with rim 112 of the friction member 101. Friction member 101 is provided with cut-out portions 114 and some of the gear teeth 92 have been removed from the shifter member 17 in a similar form, as shown at 116; whereby, when member 17 has been synchronized with gear 94, the teeth 92 will pass through the openings 114 and the cut-out portions 116 will enable the member 17 to clear the inwardly projecting portions 118 of the friction member, it being understood that both members 17 and 101 are splined to shaft 16 and that the projections of one are in alignment with the cut-out portions of the other.

Figures 19, 22:
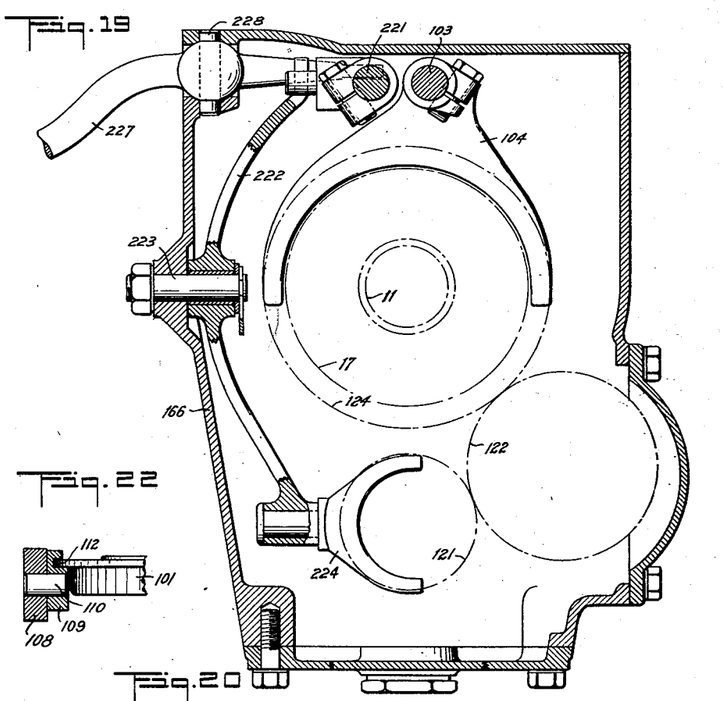
Fig. 19 is a somewhat diagrammatic view taken along the line 19—19 of Fig. 15 illustrating the lever mechanism for engaging the gears.
Fig. 22 is a sectional view taken along the line 22—22 of Fig. 20.
Figure 20:
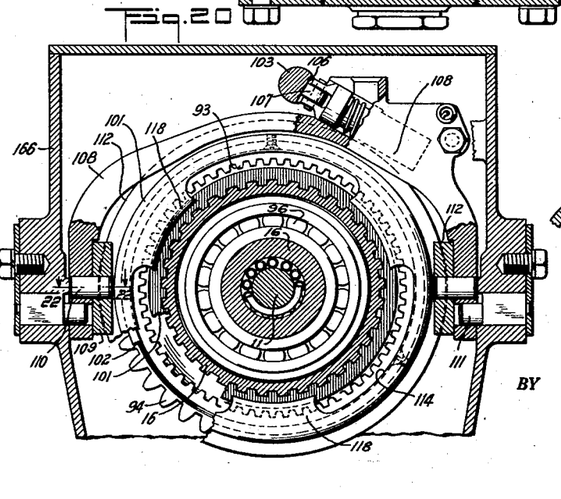
Fig. 20 is a sectional view taken on line 20—20 of Fig. 1.
Figure 21:
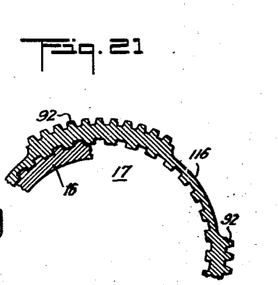
Fig. 21 is a sectional view taken along the line 21—21 of Fig. 1 illustrating a portion of the shiftable gear member used to selectively engage the automatic forward speeds or the positive forward speed.

Reverse motion of the vehicle is obtained by shifting reverse gear 121 toward the right, as viewed in Fig. 1, wherein it will mesh with reverse idler 122, diagrammatically shown in Fig. 19, and which reverse idler is in constant mesh with teeth 124 formed on the coupler member 17.

It will be noted that the operation of the high speed clutch as described is partially responsive to the speed of the driven shaft, and it is desirable under some conditions to vary the capacity of the clutch in accordance with the throttle opening whereby under closed throttle conditions the torque capacity of the clutch is increased and the transmission tends to remain in high gear at the closed throttle position. This is very desirable in city driving, for it is obvious that the vehicle operator prefers to remain in high gear if at all possible. There is no necessity for making a gear change at closed throttle positions, for if more torque is required this may be obtained by opening of the throttle.

Figure 23:
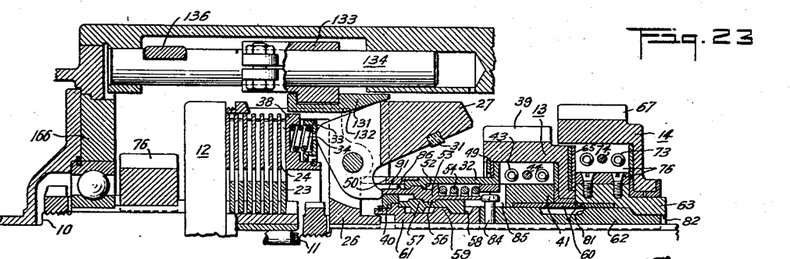
Fig. 23 is an elevational sectional view of a somewhat different form of the invention illustrating a vacuum controlled means for modifying the high speed clutch action in accordance with the engine throttle position.
Figure 24:
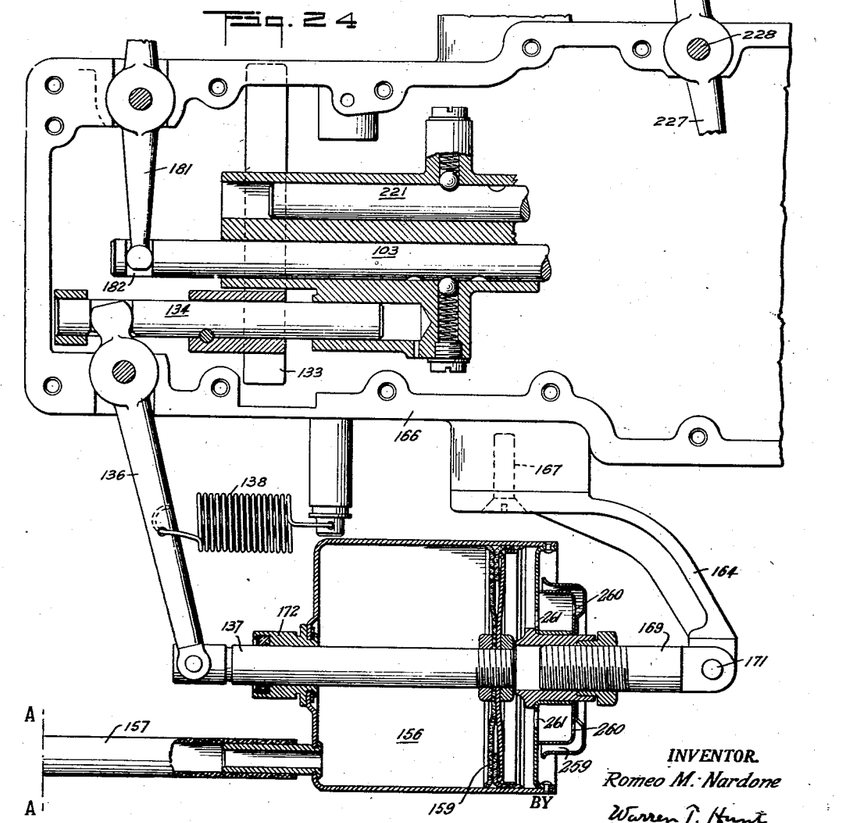
Fig. 24 is a top plan view illustrating the arrangement of the suction controlled parts for modifying the clutch action in accordance with throttle position; and, Fig. 25 is a side elevational view illustrating the connection of the high speed clutch control of Fig. 23 with the accelerator pedal of an internal combustion engine.

In Fig. 23 a means has been shown for modifying the action of weights 27 and 28 in accordance with the throttle position, which comprises a sleeve 131 having a conical inner surface 132 which contacts with the weights and restricts their outward movement. Sleeve 131 is moved by a yoke member 133 secured to a rod 134 adapted to be shifted axially of the clutch by a lever 136 secured to piston rod 137. Lever 136 is normally maintained by spring 138 in a position to remove sleeve 131 from contact with the centrifugal weights but to move the same toward the right, as viewed in Fig. 24, when the engine throttle 139 is moved to the open position by the accelerator pedal 141. The initial movement of the accelerator pedal does not affect the operation of sleeve 131 until the pin 142 of the throttle rod 143 advances to the end of the slot 144 formed in a vacuum valve generally designated as 146. When pin 142 reaches the outward end of slot 144, further movement of the accelerator pedal pulls upon the rod 147, to which is attached a flexible diaphragm member 148 and pulls the same upwardly away from its annular seat 149, whereupon the vacuum in manifold 151 is transferred through pipes 152 and 153 to the annular passage 154, from which it passes over the edge of annular seat 149 and is communicated to the cylinder 156 by the vacuum pipe 157. As the vacuum within manifold 151 is sometimes too low to actuate piston 159, it is preferred to include a vacuum pump 161 in the line which augments the vacuum within the manifold and insures an operation of piston 159 regardless of the manifold depression. Vacuum pump 161 may be of any desired construction, and in the design illustrated is preferably of the well known diaphragm type actuated by a cam 162 secured to shaft 163 operated from any desired source, such as the engine (not shown). Evacuation of cylinder 156 pulls piston 159 toward the left, as viewed in Fig. 24, and shifts sleeve 131 toward the right, as viewed in Fig. 23, whereby weights 27 and 28 are forced inwardly by the conical surface 132 and the pressure on the clutch plates is reduced sufficiently to enable a gear change to be made which ordinarily would occur at a much higher torque load. The left side of piston 159 is vented to atmosphere by a passage 259 and openings 260 and 261 which provide a tortuous pathway for the elimination of dust and dirt from cylinder 156. The piston is returned to the position shown, by spring 138 when atmospheric pressure is introduced to cylinder 156 by valve 146. It is preferred to make cylinder 156 adjustable by means of a threaded shaft 169 which is preferably pivoted at 171 to an arm 164 that is secured to the transmission case 166 by screw 167. Pivotal movement of cylinder 156 is desirable in order to prevent binding of shaft 137 in the packing gland 172, and pipe 157 is preferably made flexible in order to take care of relative movement between the cylinder 156 and the vacuum valve 146.

As in automatic transmissions the majority of speed changes are made without manual operation, it is desirable to remove all levers from the operator's compartment. Therefore, in the present invention means have been included to shift from the automatic position to the positive low speed gear and also into the reverse position by vacuum control means. The gear charges are preferably selectively actuated by a central control that may be situated in some out of the way position such as the vehicle dash (not shown).

Figure 25:
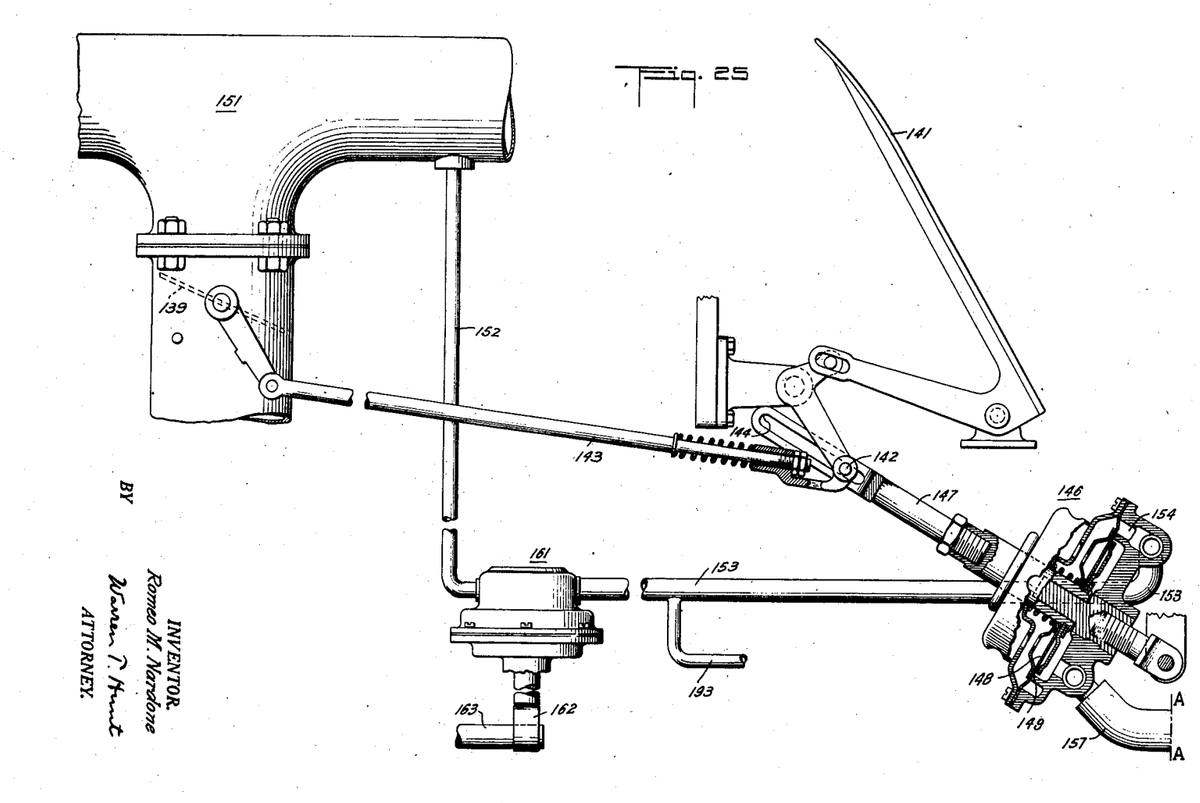

A desirable means of shifting the gears is illustrated in Figs. 15, 16, 17, and 18 in which shaft 103 is secured to a lever 181, one end of which rides within slot 182 and the other end of which is pivotally connected at 183 to rod 184 having a piston 186 secured thereto which operates in the vacuum cylinder 187. Vacuum cylinder 187 is provided with three ports 188, 189, and 191, all of which may be selectively connected to vacuum chamber 192 at all times in communication with the manifold 151 through pipe 193, as diagrammatically shown in Fig. 25.

Figures 15, 16, 17, 18:
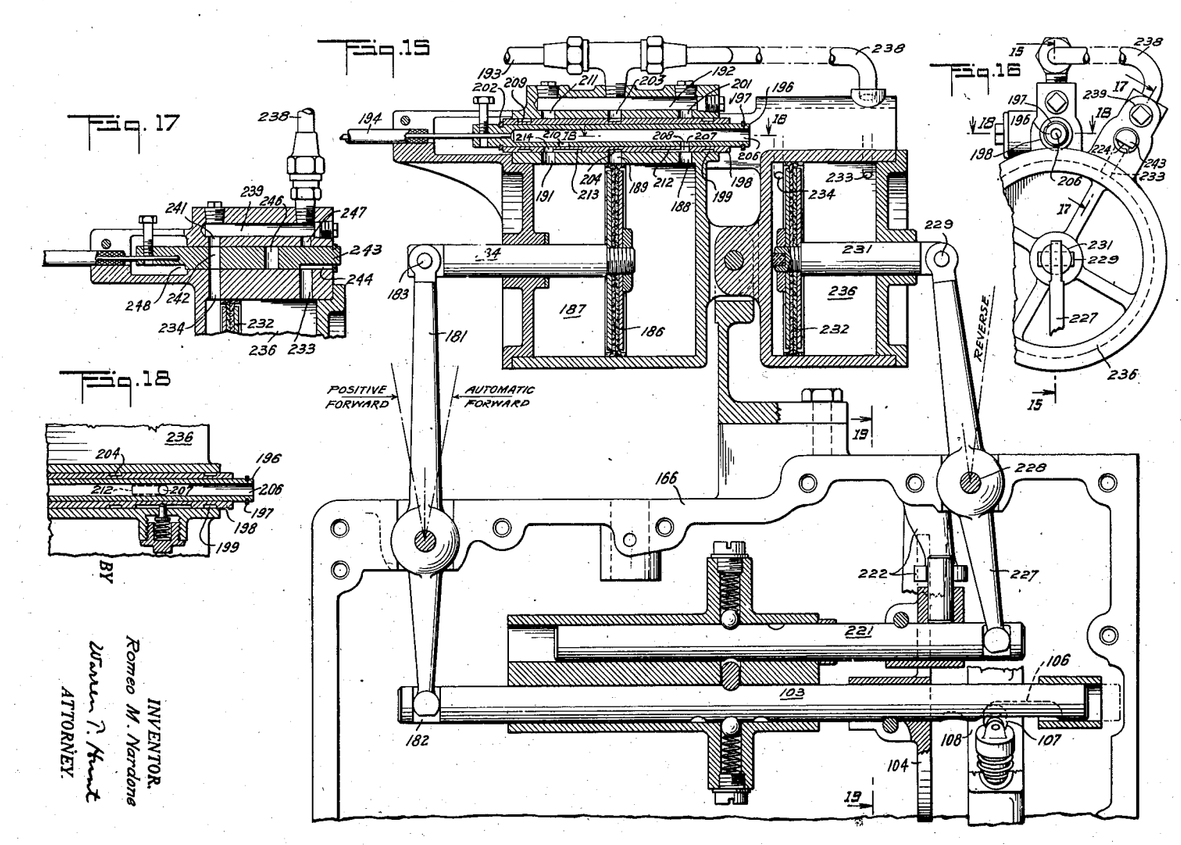
Fig. 15 is a top plan view of the vacuum control mechanism by which the reverse, positive, low speed gear and neutral positions are obtained.
Fig. 16 is an end view of the vacuum control cylinders and connections illustrated in Fig. 15.
Fig. 17 is a sectional view taken on the line 17—17 of Fig. 16.
Fig. 18 is a sectional view taken along the line 18—18 of Fig. 16.

In the position shown in Fig. 15, the transmission is in neutral, but if it should be desired to engage the transmission in the automatic forward speed, Bowden wire 194 is moved toward the left, as viewed in Fig. 15, whereby hollow rod 196 is also moved toward the left until collar 197 engages the end of sleeve 198 whereupon the sleeve is moved toward the left until annular groove 199 aligns with port 201 and port 188, whereupon the vacuum is transmitted from port 201 through annular groove 199 and port 188 to the right side of piston 186 and moves lever 181 in a clockwise direction to the position illustrated in broken lines, which corresponds to the automatic forward drive position shown in Fig. 1. In the automatic forward speed position, atmospheric pressure is applied to the left side of the piston through opening 206, ports 210 and 214, slot 213, and port 191.

If it should be desired to engage the positive forward drive, sleeve 198 is moved toward the right by a similar movement of rod 196 and collar 202 to a position wherein groove 209 is in alignment with ports 211 and 191. The left side of the piston is then exposed to vacuum and the piston moves to the left to rock lever 181 in a counter clockwise direction. The right side of the piston during the movement is open to atmosphere by means of ports 207 and 208, slot 212, and port 188.

Neutral position is obtained by moving the sleeve 198 to the position shown in Fig. 15, wherein port 189 is in communication with port 203 by means of groove 204. Piston 186 will then move to the central position wherein port 189 is covered by the piston and atmospheric pressure has been admitted to the opposite side by either port 207 or 210, the one acting as the admission port being dependent on the direction of sleeve movement to reach the intermediate position.

It will be noted that both hollow rod 196 and sleeve 198 are substantially symmetrical in their port construction about their center lines and that the operation of the valve control is substantially the same in each of its extreme positions. Slots 212 and 213 are provided which are in communication with ports 208 and 214 whereby these ports are in communication with cylinder ports 188 and 191 for a considerable movement of sleeve 198 to either side of the center position illustrated in Fig. 15 and which arrangement is made necessary because of the lost motion connection between sleeve 198 and its controlling rod 196.

Engagement of the reverse gear is obtained by movement of rod 221 to which is secured rock lever 222 pivotally mounted on the transmission case at 223 and carrying at its lower end shift fork 224 engaging groove 225 in reverse gear 121. Shifter rod 221 is engaged by the ball end of lever 227 pivotally mounted on the transmission case at 228 and having its opposite end pivotally connected at 229 to piston rod 231. A piston 232 is secured to rod 231 and adapted to be moved to the right or left, as the case may be, by vacuum that is selectively applied to opposite sides of the piston by ports 233 and 234 formed in cylinder 236. The reverse gear is shown in its disengaged position in which piston 232 has been moved toward the left, by the control position shown in Fig. 17, whereby vacuum is transmitted from pipe 238 to the chamber 239 and to the left side of piston 232 by port 241 and port 242 formed in slide valve 243, atmospheric air being admitted to the right side by port 233 and slot 244.

If it is desired to engage the reverse gear, valve 243 is moved toward the right until port 246 aligns with ports 247 and 233 in which position the vacuum from chamber 239 is transmitted to the right of piston 232 and atmospheric pressure may enter to the left of the piston by means of reduced portion 248 which is then aligned with port 234. In the reverse gear position lever 227 will assume an angular position corresponding to the broken line shown in Fig. 15 and rod 221 will be moved toward the left to engage reverse gear 121 with idler gear 122.

While certain preferred embodiments of the invention have been illustrated and described, it is understood that this showing and description are illustrative only and that the invention is not regarded as limited to the form shown and described, or otherwise, except by the terms of the following claims.

What is claimed is:

1. An automatic variable speed transmission mechanism comprising a driving shaft, a driven shaft, a friction clutch for connecting the shafts in a high gear ratio, means for connecting the shafts in a low gear ratio, means for connecting the shafts in an intermediate gear ratio, torque responsive means on the low and intermediate connecting means for disengaging the clutch when either is operative, said low and intermediate connecting means each having an overrunning clutch included therein, and means operated by the low speed connecting means for controlling the intermediate overrunning clutch.

2. An automatic variable speed transmission mechanism comprising a driving shaft, a driven shaft, a clutch for connecting the shafts in a high gear ratio, means for connecting the shafts in a low gear ratio, means for connecting the shafts in an intermediate gear ratio, torque responsive means on the low and intermediate connecting means for disengaging the clutch when either is operative, said low and intermediate connecting means each including an overrunning clutch included therein, and one of said overrunning clutches being positively held in a disengaged position upon an increase in load reaction of the connecting means including the other overrunning clutch.

3. An automatic variable speed transmission mechanism comprising a driving shaft, a driven shaft, a clutch for connecting the shafts, in a high gear ratio, means for connecting the shafts in a low gear ratio, means for connecting the shafts in an intermediate gear ratio, torque responsive means on the low and intermediate connecting means for disengaging the clutch when either is operative, said low and intermediate connecting means each having an overunning clutch included therein, and torque responsive means operated by the low gear connecting means for positively controlling the intermediate overrunning clutch upon an increase in load reaction on the low gear connecting means.

4. An automatic variable speed transmission mechanism comprising a driving shaft, a driven shaft, a clutch for connecting the shafts in a high gear ratio, means for connecting the shafts in a low gear ratio, means for connecting the shafts in an intermediate gear ratio, torque responsive means on the low and intermediate connecting means for disengaging the clutch when either is operative, said low and intermediate connecting means each having an overrunning clutch included therein, and said intermediate connecting means having its overrunning clutch held in a disengaged position upon an increase in the load reaction on the low gear connecting means and moved toward an engaging position by means responsive to the driven shaft speed.

5. An automatic variable speed transmission mechanism comprising a driving shaft, a driven shaft, a clutch for connecting the shafts in a high gear ratio, means for connecting the shafts in a low gear ratio, means for connecting the shafts in an intermediate gear ratio, means on the low and intermediate connecting means for disengaging the clutch when either is operative, said low and intermediate connecting means each having an overrunning clutch included therein, and said intermediate connecting means clutch including rollers movable by a member coacting with both the low gear connecting means and the high gear clutch to hold the rollers in an inoperative position when the low gear connecting means is engaged and to move them toward the operative position when the high gear clutch is engaged.

6. An automatic variable speed transmission comprising a driving shaft, a driven shaft, a friction clutch for connecting the shafts having centrifugal weights for engaging the clutch, a plurality of gear trains for connecting the shafts around the clutch, each of said gear trains having load responsive means adapted to engage the weights and control the clutch, and means whereby only one gear train at a time is operative to drivably connect the shafts.

7. An automatic variable speed transmission comprising a driving shaft, a driven shaft, a friction clutch for connecting the shafts having centrifugal weights for engaging the clutch, a plurality of gear trains for connecting the shafts around the clutch, each of said gear trains having load responsive means adapted to engage the weights and control the clutch, means whereby only one gear train at a time is operative to drivably connect the shafts, and the load responsive means of each of said gear trains including a threaded member reacting with a movable member to disengage the clutch when the gear train is drivably connecting the shafts.

8. An automatic variable speed transmission comprising a driving shaft, a driven shaft, a friction clutch for connecting the shafts having centrifugal weights for engaging the clutch, a plurality of gear trains for connecting the shafts around the clutch, means whereby only on gear train at a time is operative to drivably connect the shafts, and said gear trains each including an overrunning clutch having a threaded hub engaging a threaded sleeve, said sleeve being adapted to move into engagement with the weights and oppose outward movement thereof.

9. An automatic variable speed transmission comprising a driving shaft, a driven shaft, a friction clutch for connecting the shafts having centrifugal weights for engaging the clutch, a plurality of gear trains for connecting the shafts around the clutch, each of said gear trains having load responsive means adapted to engage the weights and control the clutch, means whereby only one gear train at a time is operative to drivably connect the shafts, and said load responsive means including a plurality of sleeves concentric with said shafts, each sleeve cooperative with a gear train and axially movable in accordance with load on the gear train, each of said sleeves being arranged to disengage the clutch at a predetermined load.

10. An automatic variable speed transmission comprising a driving shaft, a driven shaft, a propeller shaft, high speed forward driving means including a load responsive clutch for connecting the driving and driven shafts, lower speed forward driving means for connecting the driving and driven shafts including an overrunning clutch, a second lower speed forward driving means for positively connecting the propeller shaft and driving shaft around the driven shaft including a member adapted to directly connect the propeller shaft to the driven shaft when the positive drive is inoperative and to disconnect the same when the propeller shaft is positively connected through the second lower speed means.

11. An automatic variable speed transmission comprising a driving shaft, a driven shaft, a propeller shaft, high speed forward driving means including a load responsive clutch for connecting the driving and driven shafts, lower speed forward driving means for connecting the driving and driven shafts including an overrunning clutch, a gear train for positively connecting the propeller shaft to the driving shaft in a second lower forward speed ratio including a gear rotatably mounted on the propeller shaft, a slidable member adapted to selectively connect the propeller shaft to the gear or the driven shaft, and means for synchronizing the gear and propeller shaft speeds prior to engagement.

12. An automatic variable speed transmission including a driving shaft, a driven shaft, a clutch for connecting the shafts in high gear, intermediate gear connecting means, low gear connecting means, an overrunning clutch having rollers in each of the last named gear connecting means, a sleeve on the driven shaft axially movable thereon by load reaction of the low speed gear, a second sleeve axially movable on the first, a cage for the intermediate gear clutch rollers having a threaded connection with the second sleeve, and means on the first sleeve arranged to move the second sleeve and rotate the cage to disengage the intermediate gear roller clutch when the low gear is operatively connecting the shafts.

13. An automatic variable speed transmission including a driving shaft, a driven shaft, a clutch for connecting the shafts in high gear, intermediate gear connecting means, low gear connecting means, an overrunning clutch having rollers in each of the last named gear connecting means, a sleeve on the driven shaft axially movable thereon by load reaction of the low speed gear, a second sleeve axially movable on the first, a cage for the intermediate gear clutch rollers having a threaded connection with the second sleeve, means on the first sleeve arranged to move the second sleeve and rotate the cage to disengage the intermediate gear roller clutch when the low gear is operatively connecting the shafts, and means for preventing rotation of the cage toward an engaging position until the driven shaft has slightly overrun the cage.

14. An automatic variable speed transmission mechanism comprising a driving shaft, a driven shaft, a clutch for connecting the shafts in a high gear ratio, means for connecting the shafts in a low gear ratio, means for connecting the shafts in an intermediate gear ratio, means on the low and intermediate connecting means for disengaging the clutch when either is operative, said low and intermediate connecting means each having an overrunning clutch included therein, and manually controlled vacuum actuated means for disengaging of the clutch.

15. An automatic variable speed transmission mechanism for an engine driven vehicle having a throttle control for the engine comprising a driving shaft, a driven shaft, a load controlled centrifugally actuated friction clutch for connecting the shafts, a plurality of reduced ratio gear trains for connecting the shafts, each gear train including an overrunning clutch one of which is controlled by the operation of the other gear train, and means for decreasing the load capacity of the clutch after the throttle is fully opened and increasing the capacity when the throttle is moved toward a closed position.

16. An automatic variable speed transmission for a vehicle comprising a multispeed forward drive selectively responsive to load resistance of the vehicle, said multispeed drive including an overrunning clutch, a positive fixed ratio forward drive, and fluid pressure actuated means for engaging the fixed ratio drive at the will of the operator.

17. An automatic variable speed transmission for a vehicle comprising a multispeed forward drive selectively responsive to load resistance of the vehicle, said multispeed drive including an overrunning clutch, a positive fixed ratio forward drive, fluid pressure actuated means for selectively engaging either of said drives, and a selective control valve for the pressure actuated means adapted to control a flow of pressure to the same to change the drive back and forth from automatic to positive drive or to move either drive to a neutral position at which the vehicle is disconnected from the power source.

18. A variable speed transmission comprising a plurality of variable speed drives, a shifter rod therefor adapted to assume three positions corresponding to two operative positions with an intermediate third position, a pressure operated piston operatively connected to the shifter rod, a cylinder enclosing the piston having three ports, means for producing a pressure differential on opposite sides of the piston, and a longitudinally slidable valve adapted to close any one port and positively open two other ports in a manner to move the piston to either end of the cylinder or to stop at an intermediate position at the will of the operator.

19. A variable speed transmission comprising a plurality of variable speed drives, a shifter rod therefor adapted to assume three positions corresponding to two operative positions with an intermediate third position, a pressure operated piston operatively connected to the shifter rod, a cylinder enclosing the piston having three ports, means for producing a pressure differential on opposite sides of the piston, and a valve adapted to close any one port and open one other port in a manner to move the piston to either end of the cylinder or to stop at an intermediate position at the will of the operator, said valve including a hollow shaft having an atmospheric opening and ports adapted to align with certain cylinder ports, a sleeve surrounding the shaft and movable therewith after a predetermined shaft movement, said sleeve having grooves thereon adapted to connect another cylinder port to a source of pressure having a value different from atmospheric pressure.

20. An automatic variable speed transmission comprising a driving shaft, a driven shaft, means for connecting the shafts in any one of a plurality of driving ratios, means for automatically actuating the connecting means, and means including interlocking relatively movable shoulders for preventing the engagement of one of said driving ratios until the speed of the driving shaft has been changed to a speed substantially corresponding to the normal driving shaft speed requirement for that particular driving ratio.

21. An automatic variable speed transmission comprising a driving shaft, a driven shaft, means for connecting the shafts in any one of a plurality of driving ratios, means for automatically actuating the connecting means, one of said connecting means having an overrunning clutch, and means for controlling the operation of said clutch including a pair of relatively movable interlocking shoulders for preventing the engagement of the clutch until the driven shaft has slightly overrun the driving shaft.

22. An automatic variable speed transmission comprising a driving shaft, a driven shaft, means for connecting the shafts in at least three driving ratios, means for automatically selecting the driving ratio in accordance with driven shaft requirements, an overrunning roller clutch in one of said connecting means, a movable cage member operatively connected to the driving shaft for moving the clutch rollers to an inoperative position when another of said driving ratios is operative, and a shoulder on the cage cooperative with a shoulder on a device connected to the driven shaft for preventing movement of the cage and restraining the rollers from assuming a driving position until the driving shaft speed has been reduced to a less speed than the driven shaft.

23. An automatic variable speed transmission comprising a driving shaft, a driven shaft, means for connecting the shafts in at least three driving ratios, means for automatically selecting the driving ratio in accordance with driven shaft requirements, an overrunning roller clutch in one of said connecting means, a cage member for moving the clutch rollers to an inoperative position, said cage member having helical teeth thereon, a member axially movable of the shafts having similar teeth cooperating with the cage teeth to move the rollers to an inoperative position, and the teeth of one member having reduced portions forming shoulders adapted to engage the teeth faces of the mating member to prevent rotation of the cage until one of the members has slightly overrun the other member.

24. In an automatic variable speed transmission having three speed ratio devices, a single friction clutch for one speed ratio, means operative by torque reaction on either of the other two speed ratio devices for disengaging the clutch, and means actuated by load reaction on one of the last named devices for rendering the other device inoperative.

25. In an automatic variable speed transmission, a driving shaft, a driven shaft, a friction clutch for connecting the shafts, gear means including a roller clutch having two opposite overrunning positions for connecting the shafts around the clutch, and means rotated by the driving shaft adapted to simultaneously actuate both the roller clutch and the friction clutch.

26. In an automatic variable speed transmission mechanism a driving shaft, a driven shaft, a friction clutch for connecting the shafts, gear means for connecting the shafts around the clutch, said gear means including a clutch having two opposite overrunning positions, centrifugal weights carried by said clutch arranged to simultaneously engage the friction clutch and move the other clutch to one overrunning position in the outward position of the weights, and to simultaneously disengage the friction clutch and move the other clutch to the opposite overrunning position in the inward position of the weights.

27. In an automatic variable speed transmission mechanism, a driving shaft, a driven shaft, devices for connecting the shafts in at least three speed ratios, the highest of which includes a friction clutch and another of which includes an overrunning clutch, and automatic means including a member movable in response to load on the lowest speed ratio device arranged to disengage both the friction and overrunning clutches to render the two higher speeds inoperative when the transmission is operated from an initial at-rest position.

28. In an automatic variable speed transmission mechanism, a driving shaft, a driven shaft, a single friction clutch, gear trains for connecting the shafts around the clutch in a plurality of gear ratios, said gear trains having means associated therewith for operatively selecting one of said gear trains in accordance with the load on the driven shaft, means for rendering said gear trains inoperative when the clutch is engaged, and a single means actuated by either of said gear trains and cooperative with the friction clutch to disengage the same when either gear train is operative.

29. In an automatic speed mechanism, a driving shaft, a driven shaft, a high speed driving mechanism, an intermediate speed driving mechanism, a low speed driving mechanism, and a synchronizing device having relatively rotatable and axially movable coacting toothed members operatively connected with the driven shaft and the intermediate speed driving mechanism respectively and arranged to abut in one position and to mesh in another position for locking positively the intermediate speed driving mechanism against engagement until the driving shaft has lagged slightly behind the driven shaft.

30. In a variable speed automatic transmission a driving shaft, a driven shaft, means for connecting the shafts in a high speed ratio, a gear train for connecting the shafts in an intermediate speed ratio including a gear having an overrunning clutch, means for connecting the shafts in a low speed ratio, and synchronizing means controlled by relative angular position of the gear and driven shaft for preventing operative engagement of the intermediate gear train overrunning clutch until the driven shaft has slightly overrun the driving gear.

31. In a variable speed automatic transmission, a driving shaft, a driven shaft, means for connecting the shafts in a high speed ratio, a gear train for connecting the shafts in an intermediate speed ratio including a gear having an overrunning clutch, means for connecting the shafts in a low speed ratio, and synchronizing means controlled by relative angular position of the gear and driven shaft for preventing operative engagement of the intermediate gear train overrunning clutch until the driven shaft has slightly overrun the gear, said engagement preventing means being cooperative with the overrunning clutch to hold it in a disengaged position until after the overrunning movement of the driving shaft.

32. In an automatic variable speed transmission, a driving shaft, a driven shaft, means for connecting the shafts in at least three speed ratios, and synchronizing means having relatively rotatable and axially movable coacting toothed members operatively connected with the driven shaft and the intermediate speed driving mechanism respectively and arranged to abut in one position and to mesh in another position controlled by relative movement of the connecting means and the driven shaft for positively locking one of said speed ratio connecting means against engagement until the driven shaft has advanced slightly with respect to the connecting means.

33. In an automatic variable speed transmission, a driving shaft, a driven shaft, means for connecting the shafts in at least three speed ratios, and synchronizing means controlled by relative movement of the shafts for locking one of said speed ratio connecting means against engagement until the driven shaft has advanced slightly with respect to the driving shaft, said synchronizing means including coacting relatively movable toothed members operatively connected with the driving and driven shafts respectively and arranged to abut in one position and to mesh in another position, means operated by one of said members for disengaging one of the speed ratio connecting means, and means operated by the other member in response to load on another of said ratio connecting means for disengaging the remaining speed ratio connecting means.

34. In a variable speed automatic transmission, a driving shaft, a driven shaft, a clutch for connecting the shafts, centrifugal weights for controlling the clutch, a gear train for connecting the shafts in an intermediate speed ratio including an overrunning clutch, means for connecting the shafts in a low speed ratio, a member operated by the weights to engage the intermediate gear clutch, and means for preventing engagement of the intermediate gear clutch until the driven shaft has slightly overrun the driving shaft.

35. In an automatic transmission for a vehicle having an engine and a manual control therefor, a driving shaft, a driven shaft, means including a friction clutch for connecting the shafts in a high gear ratio, centrifugal weights for controlling the friction clutch, means including an overrunning clutch for connecting the shafts in a lower gear ratio when the friction clutch is disengaged, and shiftable means operatively connected with the manual control and engaging the exterior of the weights for positively depressing the weights to control the friction clutch and connect the shafts in the low speed ratio through the overrunning clutch at the will of the operator.

36. In an automatic transmission for a vehicle having an engine and a throttle control therefor, a driving shaft, a driven shaft, means including a friction clutch for connecting the shafts in a high gear ratio, centrifugal weights for controlling the friction clutch, means including an overrunning clutch for connecting the shafts in a lower speed ratio when the friction clutch is disengaged, and means interconnected with the throttle control for positively depressing the weights at a predetermined position of said throttle to control the friction clutch and connect the shafts in the lower speed ratio at the will of the operator.

37. In an automatic transmission for a vehicle having an engine and a throttle control therefor, a driving shaft, a driven shaft, means including a friction clutch for connecting the shafts in a high gear ratio, centrifugal weights for controlling the friction clutch, means including an overrunning clutch for connecting the shafts in a lower speed ratio when the friction clutch is disengaged, and means interconnected with the throttle control for positively depressing the weights at a predetermined position of said throttle to control the friction clutch and connect the shafts in the lower speed ratio when the throttle is moved to substantially the wide open position.

38. In an automatic variable speed transmission mechanism, a driving shaft, a driven shaft, a high speed driving mechanism, an intermediate speed driving mechanism having a clutch, a low speed driving mechanism, a synchronizing device operatively connected with the clutch to engage and disengage the same, said device having relatively rotatable and axially movable coacting toothed members operatively connected with the driving and driven shafts respectively, one of said toothed members having its teeth formed with shoulders adapted to overlap the ends of the teeth of the other member in one relative rotatable position, said shoulders being so arranged as to lock the members against relative axial movement when the member connected with the driving shaft is in driving contact with the other member, and to clear the teeth of the other member when in a non-abutting position, one of said toothed members being arranged to engage the clutch upon axial movement thereof, and means to move the member to a clutch engaging position.

ROMEO M. NARDONE.